United States Patent [19]

Wildern, IV

[11] Patent Number: 5,362,128
[45] Date of Patent: Nov. 8, 1994

[54] MECHANICAL THIGH SUPPORT

[75] Inventor: William J. Wildern, IV, Farmington Hill, Mich.

[73] Assignee: General Motors Corporation, Detroit, Mich.

[21] Appl. No.: 103,144

[22] Filed: Aug. 9, 1993

[51] Int. Cl.⁵ .............................................. A47C 3/00
[52] U.S. Cl. ........................... 297/284.11; 297/423.26
[58] Field of Search ........... 297/284.1, 284.11, 452.21, 297/423.26, 423.3

[56] References Cited

U.S. PATENT DOCUMENTS

| | | | |
|---|---|---|---|
| 3,550,953 | 12/1970 | Neale | 297/284.11 X |
| 4,018,477 | 4/1977 | Hogan | 297/284.11 |
| 4,324,431 | 4/1982 | Murphy et al. | 297/284 |
| 4,334,709 | 6/1982 | Akiyama et al. | 297/284 |
| 4,541,669 | 9/1985 | Goldner | 297/284 |
| 4,636,002 | 1/1987 | Genjiro | 297/319 |
| 4,693,513 | 9/1987 | Heath | 297/284 |
| 4,717,203 | 1/1988 | Meiller | 297/312 |
| 4,775,185 | 10/1988 | Scholin et al. | 297/284.11 |
| 4,915,447 | 4/1990 | Shovar | 297/284 |

Primary Examiner—Kenneth J. Dorner
Assistant Examiner—Milton Nelson, Jr.
Attorney, Agent, or Firm—Ernest E. Helms

[57] ABSTRACT

A vehicle seat with an adjustable thigh support is provided including a vehicle seat frame, the seat frame providing support for a portion of a leg section of a vehicle occupant; a thigh support pan pivotally mounted with respect to the seat frame providing support for the portion of the leg section at a forward end of the seat frame; a main gear track projecting from the thigh support pan on a side of the thigh support pan generally opposite the leg section of a vehicle occupant, the main gear track having a toothed surface; a gear housing fixed with respect to the seat frame, the gear housing having rotatably mounted thereto a gear for meshing engagement with the main gear track toothed surface, the gear housing also having space from the gear and alignment pin for capturing the main gear track between the gear and the alignment pin; a receiving gear track pivotally mounted with respect to the thigh support pan having a toothed surface for engagement with the gear, the receiving gear track also having a handle portion for impartation of pivotal movement; and a spring to pivotally bias the receiving gear track into engagement with the gear.

5 Claims, 2 Drawing Sheets

MECHANICAL THIGH SUPPORT

FIELD OF THE INVENTION

The field of the present invention is that of a vehicle seat. More particularly, the field of the present invention is that of vehicle seats with adjustable thigh supports.

BACKGROUND OF THE INVENTION

To increase the comfort of a vehicle seat occupant and to lessen fatigue, it is desirable to provide a thigh support whose inclination with respect to the remainder of the seat may be adjusted. An example of such an adjustable thigh support (sometimes referred to as a leg support) is shown and described in commonly assigned U.S. Pat. No. 4,693,513 to Heath.

SUMMARY OF THE INVENTION

The present invention provides a manually adjustable thigh support which is an alternative to that shown in Heath which also provides linear as well as radial adjustment.

DESCRIPTION OF THE PREFERRED EMBODIMENT

Figure 1:
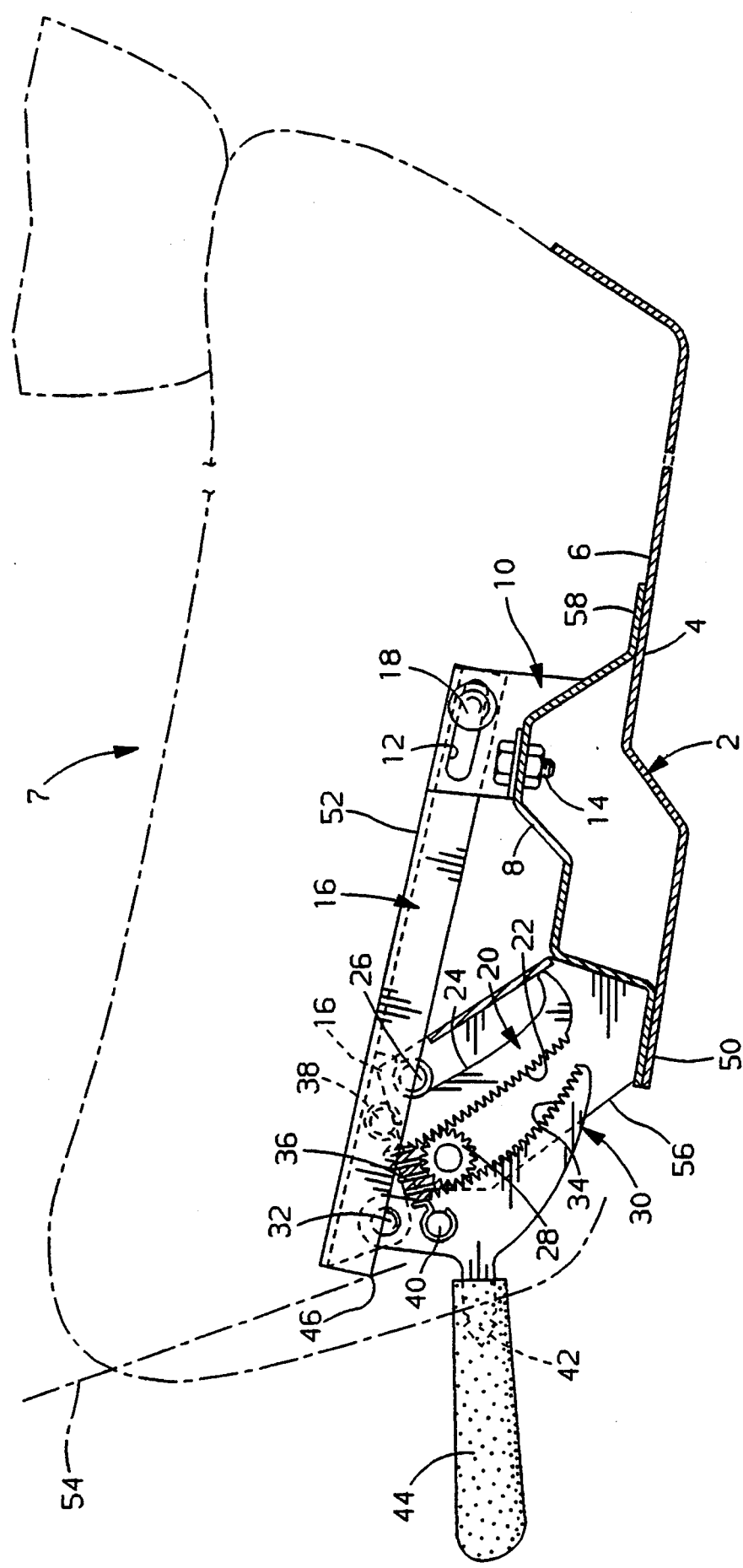
FIG. 1 is a side elevational view of a preferred embodiment vehicle seat having an adjustable thigh support according to the present invention.
Figure 2:
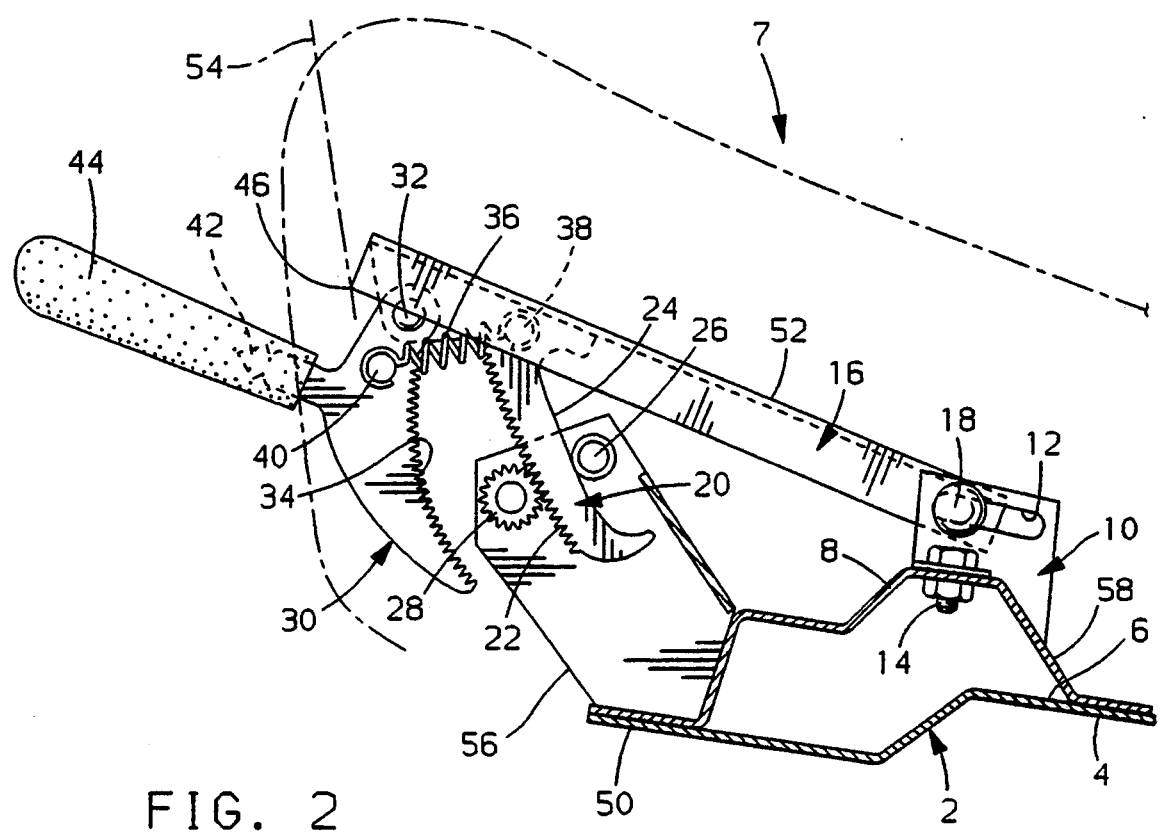
FIG. 2 is an operational view showing the adjustment of the vehicle seat shown in FIG. 1.
Figure 3:
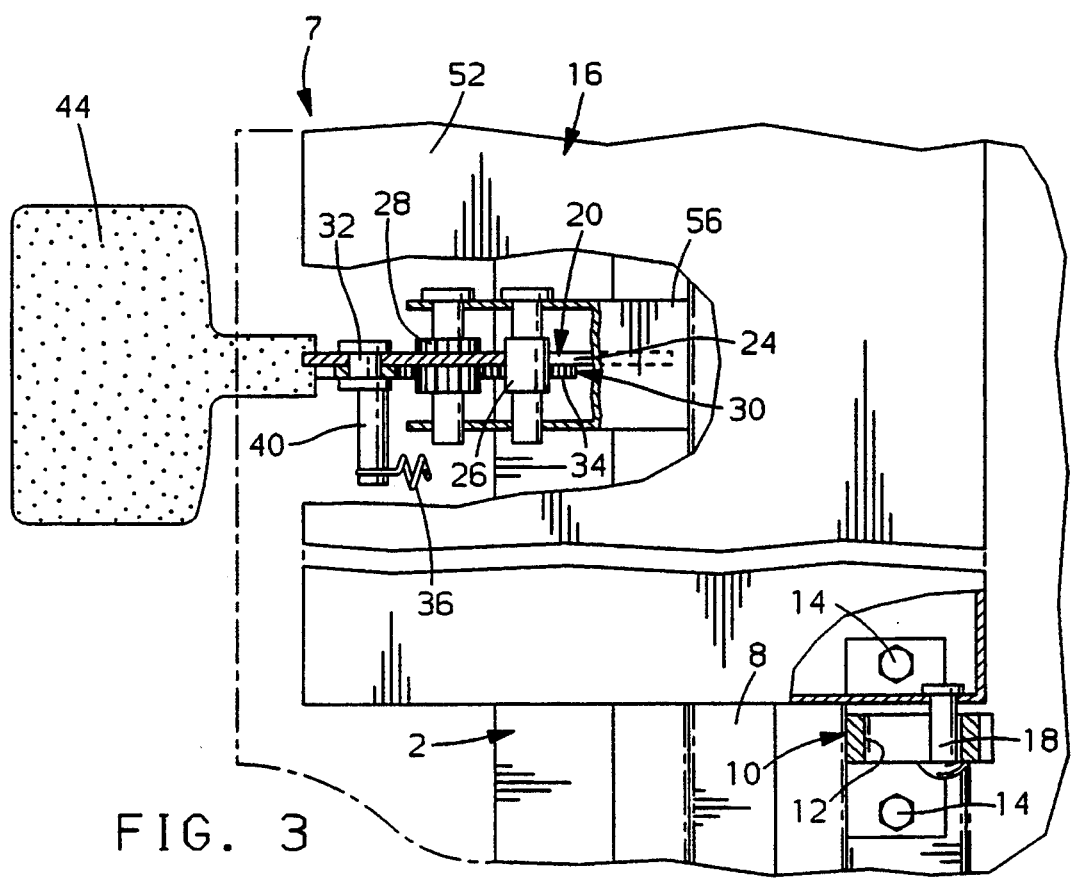
FIG. 3 is a top plane view of the vehicle seat shown in FIG. 1 with portions cut away and sectioned.

Referring to FIGS. 1, 2 and 3, the vehicle seat 7 of the present invention has a seat frame 2 which is directly or adjustably connected, via a conventional adjustment device, with the floor of a vehicle (not shown). The seat frame 2 has a rearward portion 4 which provides a seating support surface 6. The seat frame 2 also has a mound 8 for positioning two transversely spaced slotted housings 10 (only one shown). A rearward end 58 of the mound 8 aids in the prevention of submarining of a vehicle occupant in a collision. The slotted housings 10 have an oblong slot 12 and are typically fabricated from a polymeric material and can be attached to the seat frame by a fastener 14. The seat frame also has a forward section or end 50.

Pivotally mounted in a translational and angularly adjustable or radially adjustable manner with respect to the seat frame 2 is a thigh support pan 16. The thigh support pan 16 at its rearward end has two extending pins 18 which fit into the elongated slots 12 of the two spaced-apart slotted housings 10. The thigh support pan 16 has a support surface 52 on its top end for supporting a portion of a seat occupant's leg along a forward end of the seat frame.

Joined by welding or other suitable means to the thigh support pan 16 on a side opposite its support surface 52 is a main gear track 20. The main gear track 20 projects generally downwardly from the thigh support pan. The main gear track 20 has along its forward end a tooth surface 22 and along its rearward end a smooth surface 24. The main gear track 20 will have a curvilinear shape configured in a predetermined manner for purposes to be described later.

Affixed to the forward end 50 of the seat frame is a gear housing 56. The gear housing 56 has rotatably connected thereto a gear 28 and an alignment pin roller 26. The alignment pin roller 26 is spaced from the gear 28 and captures between itself and the main gear 28 the main gear track 20.

Pivotally mounted to the thigh support pan 16 either directly or via the main gear 20 is a receiving gear track 30. The receiving gear track is pivotally mounted by a pin 32 and has a tooth section 34 for selective engagement with the gear 28. To torsionally bias the receiving gear track 30 to engage with the gear 28, there is provided a coil spring 36 connected with a mounting pin 38 of the main gear track and a mounting pin 40 of the receiving gear track. To impart pivotal movement to the receiving gear track 30, there is a stud 42 connected with a handle It will be apparent to those skilled in the art that in operation, the rear portion 6 of the seat frame 2 and the thigh support pan 16 will be appropriately covered with padding and a seat cover which are only shown in phantom to provide for clarity of illustration. In the position shown in FIG. 1, the thigh support pan 16 is locked from rotation or movement by virtue of the engagement of the gear 28 with the tooth sections 22 and 34 of the main gear track and the receiving gear track 30. To adjust the thigh support pan 16, the vehicle seat occupant pulls upward on handle 44 (FIG. 2), causing the receiving gear track 30 to remove itself from engagement with the gear 28 against the biasing of the spring 36. The configuration of the curvilinear shape of the main gear track 20 is of such a nature that a projection 54 of portion 46 of the thigh support pan front end will be linear during its adjustment, causing the thigh support pan front portion 46 to extend upward approximately 40 millimeters while going forward approximately 10 millimeters. To accommodate the linear movement of the front end 46 of the thigh support pan 16, the pin 18 will move forwardly within the slot 12 during the adjustment to the uppermost position. In an alternative not shown, the main gear track 20 may be configured in such a manner that only radial adjustment is provided. When engaged with the gear 28, the tooth section 34 of the receiving gear track (in contact with gear 28) will be parallel with the tooth section 22 of the main gear track.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle seat with an adjustable thigh support comprising:
    a vehicle seat frame, the seat frame providing support for a portion of a leg section of a vehicle occupant;
    a thigh support pan pivotally mounted with respect to the seat frame providing support for the portion of the leg section at a forward end of the seat frame;
    a main gear track projecting generally downwardly from the thigh support pan, the main gear track having a toothed surface;
    a gear housing fixed with respect to the seat frame, the gear housing having directly and rotatably mounted thereto a gear for meshing engagement with the main gear track toothed surface, the gear housing also having spaced away from the gear an alignment pin for capturing the main gear track between the gear and the alignment pin; and a receiving gear track pivotally mounted with respect to the thigh support pan having a toothed surface for engagement with the gear, the receiving gear track also having a handle portion for impartation of pivotal movement and the receiving gear track being pivotally biased into engagement with the gear.

2. A vehicle seat as described in claim 1 wherein the alignment pin is provided by a roller rotatably mounted with the gear housing.

3. A vehicle seat as described in claim 1 wherein the pivotal mounting of the thigh support pan with respect to the seat frame is accomplished by a pin-and-slot type arrangement allowing the thigh support pan to have translational as well as angular movement with respect to the seat frame.

4. A vehicle seat as described in claim 2 wherein the main gear track has a curvilinear configuration such that a projection of a front end of the thigh support pan in its various positions of adjustment forms a linear line.

5. A vehicle seat with an adjustable thigh support comprising:

a vehicle seat frame, the seat frame providing support for a portion of a leg section of a vehicle occupant;

a thigh support pan having a pin and slot pivotal mounting with the seat frame along a rearward end of the thigh support pan, the thigh support pan providing support for a portion of the leg section of the vehicle occupant at a forward end of the vehicle seat frame;

a main gear track projecting generally downwardly from the thigh support pan, the main gear track having a toothed surface and a predetermined curvilinear configuration;

a gear housing fixed with the seat frame generally underneath the thigh support pan, the gear housing having rotatably mounted thereto a gear for meshing engagement with the main gear track toothed surface, the gear housing also having spaced away from the gear an alignment pin roller for capturing the main gear track between the gear and the alignment pin roller;

a receiving gear track pivotally mounted with respect to the thigh support pan having a toothed surface for engagement with the gear and a handle portion for impartation of pivotal movement to the receiving gear track; and a spring connected with the receiving gear track for pivotally biasing the receiving gear track into engagement with the gear and wherein during adjustment a forward end of the thigh support pan projects a linear adjustment path.

* * * * *